(12) United States Patent
Bai et al.

(10) Patent No.: US 12,723,569 B2
(45) Date of Patent: Sep. 1, 2026

(54) FORECASTING OUTPUT POWER OF WIND TURBINE IN WIND FARM

(71) Applicant: Utopus Insights, Inc., Valhalla, NY (US)

(72) Inventors: Xin Xin Bai, Beijing (CN); Jin Dong, Beijing (CN); Hui Du, Beijing (CN); Xiao Guang Rui, Beijing (CN); Hai Feng Wang, Beijing (CN); Wen Jun Yin, Beijing (CN); Meng Zhang, Beijing (CN)

(73) Assignee: Utopus Insights, Inc., Valhalla, NY (US)

( * ) Notice: Subject to any disclaimer, the term of this patent is extended or adjusted under 35 U.S.C. 154(b) by 0 days.

(21) Appl. No.: 17/663,828

(22) Filed: May 17, 2022

(65) Prior Publication Data

US 2022/0275788 A1 Sep. 1, 2022

Related U.S. Application Data

(63) Continuation of application No. 16/286,500, filed on Feb. 26, 2019, now Pat. No. 11,408,399, which is a (Continued)

(30) Foreign Application Priority Data

Feb. 28, 2013 (CN) ........................ 201310063237.X

(51) Int. Cl.

*F03D 17/00* (2016.01)
*G01W 1/10* (2006.01)
*G06Q 10/04* (2023.01)

(52) U.S. Cl.

CPC ........ *F03D 17/00* (2016.05); *F05B 2260/821* (2013.01); *F05B 2260/8211* (2013.01); (Continued)

(58) Field of Classification Search

CPC ... Y02E 10/723; Y02E 10/763; Y02E 10/766; G06Q 50/06; F03D 7/048; F03D 17/00; (Continued)

(56) References Cited

U.S. PATENT DOCUMENTS 6,925,385 B2 8/2005 Ghosh et al.
6,975,925 B1 12/2005 Barnes et al.
(Continued)

FOREIGN PATENT DOCUMENTS

CN 101794996 A 8/2010
CN 102663513 A 9/2012
(Continued)

OTHER PUBLICATIONS

Clayton, Adam et al., "The Met Office Hybrid Data Assimilation Scheme," Met Office, 9th Adjoint Workshop, Oct. 2011.
(Continued)

*Primary Examiner* — Mohamed Charioui
(74) *Attorney, Agent, or Firm* — Ahmann Kloke LLP

(57) ABSTRACT

A method and apparatus for forecasting output power of wind turbine in a wind farm. The present invention provides a method for forecasting output power of a wind turbine in a wind farm, including: generating a corrected data set based on environmental data collected from at least one sensor in the wind farm; correcting a weather forecasting model by using the corrected data set; obtaining a forecast value of wind information at the wind turbine based on the corrected weather forecasting model; and forecasting the output power of the wind turbine based on the forecast value and a power forecasting model.

19 Claims, 8 Drawing Sheets

Related U.S. Application Data continuation of application No. 14/187,807, filed on Feb. 24, 2014, now Pat. No. 10,215,162.

(52) U.S. Cl.
CPC ......... *F05B 2270/335* (2013.01); *G01W 1/10* (2013.01); *G06Q 10/04* (2013.01); *Y02A 30/00* (2018.01); *Y02E 10/72* (2013.01); *Y02E 10/76* (2013.01); *Y02E 60/00* (2013.01)

(58) Field of Classification Search
CPC ........ F03D 9/005; F03D 7/0284; F03D 7/028; F03D 7/045; F03D 7/046; F03D 7/00
See application file for complete search history.

(56) References Cited

U.S. PATENT DOCUMENTS

| | | | | |
|---|---|---|---|---|
| 8,150,641 | B2 | 4/2012 | Morjaria et al. | |
| 2002/0194113 | A1* | 12/2002 | Lof | G01W 1/10 705/37 |
| 2005/0114028 | A1 | 5/2005 | Wada | |
| 2011/0082597 | A1* | 4/2011 | Meagher | H02J 3/38 700/291 |
| 2011/0307109 | A1 | 12/2011 | Sri-Jayantha | |
| 2012/0029712 | A1 | 2/2012 | Parikh et al. | |
| 2012/0046917 | A1 | 2/2012 | Fang et al. | |
| 2012/0050750 | A1 | 3/2012 | Hays et al. | |
| 2012/0065886 | A1* | 3/2012 | Kline | G01W 1/10 702/3 |
| 2012/0101644 | A1 | 4/2012 | Evans et al. | |
| 2012/0185414 | A1 | 7/2012 | Pyle et al. | |
| 2012/0226485 | A1 | 9/2012 | Creagh et al. | |
| 2013/0317748 | A1* | 11/2013 | Obrecht | F03D 7/048 702/3 |
| 2014/0142779 | A1 | 5/2014 | Stoettrup et al. | |
| 2014/0195159 | A1* | 7/2014 | Mewes | G01W 1/10 702/3 |
| 2014/0324495 | A1* | 10/2014 | Zhou | F03D 80/50 705/7.13 |
| 2014/0336833 | A1* | 11/2014 | Marinopoulos | G06N 20/00 290/44 |
| 2014/0344209 | A1* | 11/2014 | Fang | G06N 7/01 706/52 |
| 2019/0120208 | A1 | 4/2019 | Geisler et al. | |

FOREIGN PATENT DOCUMENTS

| | | | |
|---|---|---|---|
| CN | 102269124 | B | 4/2013 |
| CN | 102945508 | B | 1/2014 |
| CN | 102570453 | B | 4/2015 |
| JP | 2005134243 | A | 5/2005 |

OTHER PUBLICATIONS

George Sideratos and Nikos D.Hatziargyriou; "An Advanced Statistical Method for Wind Power Forecasting;" Jan. 29, 2007; IEEE Transactions on Power Systems; vol. 22, Issue 1; pp. 258-265. (Year: 2007).

* cited by examiner

FORECASTING OUTPUT POWER OF WIND TURBINE IN WIND FARM

CROSS-REFERENCE TO RELATED APPLICATIONS

The present application is a continuation of U.S. patent application Ser. No. 16/286,500 filed Feb. 26, 2019, entitled "FORECASTING OUTPUT POWER OF WIND TURBINE IN WIND FARM," which is a continuation of U.S. patent application Ser. No. 14/187,807 filed Feb. 24, 2014 and entitled "FORECASTING OUTPUT POWER OF WIND TURBINE IN WIND FARM," now U.S. Pat. No. 10,215,162, which claims priority to Chinese Patent Application No. 201310063237.X filed Feb. 28, 2013, all of which are hereby incorporated by reference herein.

FIELD OF THE INVENTION

Embodiments of the present invention relate to power forecasting, and more specifically, to a method and apparatus for forecasting output power of a wind turbine in a wind farm.

BACKGROUND OF THE INVENTION

As wind energy is clean, pollution-free and renewable, wind power plays an increasingly important role in the worldwide exploration of new energy. Output power of a wind turbine is constrained by many factors, so it is hard to forecast output power of each wind turbine in a wind farm. In addition, output power of wind turbines has such typical characteristics as being non-linear, fast changing, uncontrollable and the like, so output power of the wind farm to the power grid is prone to fluctuations.

Output power of wind turbines usually depends on meteorological elements of the location of a wind farm. Typically a wind farm is located in a remote area, while meteorological data provided by a meteorological bureau usually fail to cover the surrounding environment of the wind farm. Moreover, meteorological elements at the wind farm are constrained by other conditions (e.g., impacts on airflow of local topographic impact inside the wind farm or rotation of wind turbines themselves, etc.). Even if a meteorological bureau provides a weather forecast in the wind farm area, the weather forecast cannot completely accurately resolve meteorological conditions at the wind farm.

Currently, forecasting of output power of wind turbines mainly focuses on a level of the whole wind farm, and there lacks power forecasting of a single turbine. In addition, forecasting methods rely on analysis and statistics of historical power data and forecast future output power via historical output power or based on meteorological elements at a wind farm by buying general-purpose weather forecasts from a third party.

Solutions in the prior art still rest on commercially available (or free) general meteorological data to forecast output power of wind farms. As these technical solutions ignore special characteristics of in-situ meteorological elements at wind farms, they are prone to large errors during forecasting. On the one hand, errors in power forecasting result in that the overall output power of the power plant becomes unstable, seriously deviates from electricity producing plans and exerts impact on the power grid integration; on the other hand, since output power of the power plant falls behind or goes over far beyond the expected value, the power plant is subjected to punitive sanctions such as fines. Therefore, it becomes a research focus regarding how to accurately forecast output power of a specific wind turbine (e.g., any wind turbine) in a wind farm during a specific period of time.

Therefore, it is desired to develop a technical solution capable of accurately forecasting output power of a specific wind turbine based on meteorological elements at the location of the wind turbine. And it is desired the technical solution is capable of sufficiently leveraging sensors within the wind farm (e.g., meteorological sensors at the wind tower, sensors at hub-height of a wind turbine, etc.), and correcting a general-purpose weather forecasting model by using the meteorological data as measured in-situ, so as to reveal wind information at the specific wind turbine within the wind farm more accurately. To this end, embodiments of the present invention provide methods and apparatuses for forecasting output power of a wind turbine in a wind farm.

SUMMARY OF THE INVENTION

One aspect of the present invention provides a method for forecasting an output power of a wind turbine in a wind farm. The method includes: generating a corrected data set based on environmental data collected from a in the wind farm; correcting a weather forecasting model by using the corrected data set; obtaining a forecast value of wind information at the wind turbine based on the weather forecasting model which is corrected using the corrected data set; and forecasting the output power of the wind turbine based on the forecast value and a power forecasting model.

Another aspect of the present invention provides an apparatus for forecasting output power of a wind turbine in a wind farm. The apparatus includes: a generating module configured to generate a corrected data set based on environmental data collected from at least one sensor in the wind farm; a correcting module configured to correct a weather forecasting model by using the corrected data set; an obtaining module configured to obtain a forecast value of wind information at the wind turbine based on the weather forecasting model that is corrected by using the corrected data set; and a forecasting module configured to forecast the output power of the wind turbine based on the forecast value and a power forecasting model.

BRIEF DESCRIPTION OF THE DRAWINGS

Through the more detailed description below in conjunction with the accompanying drawings, the features, advantages and other aspects of the embodiments of the present invention will become more apparent. Several embodiments of the present invention are illustrated here in an exemplary rather than restrictive manner.

DETAILED DESCRIPTION OF THE PREFERRED EMBODIMENTS

Figure 1:
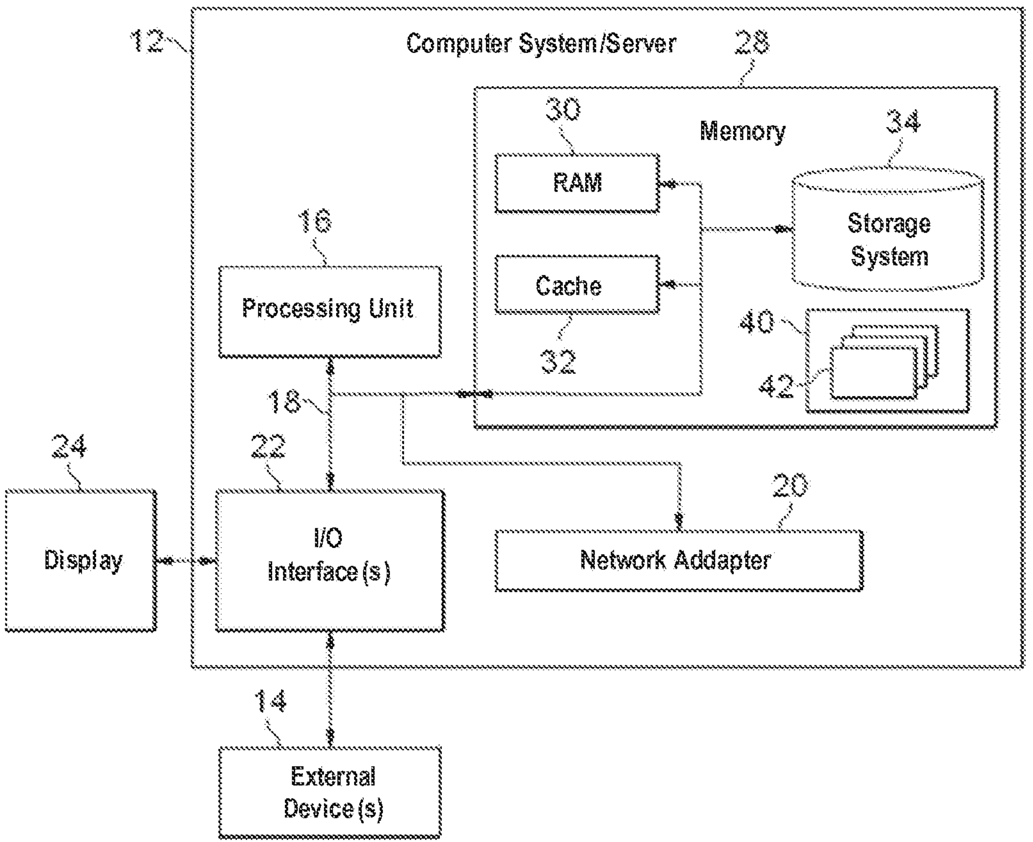
FIG. 1 schematically illustrates a block diagram of an exemplary computer system which is applicable to implement the embodiments of the present invention.

Some preferable embodiments will be described in more detail with reference to the accompanying drawings, in which the preferable embodiments of the present disclosure have been illustrated. However, the present disclosure can be implemented in various manners, and thus should not be construed to be limited to the embodiments disclosed herein. On the contrary, those embodiments are provided for the thorough and complete understanding of the present disclosure, and completely conveying the scope of the present disclosure to those skilled in the art.

As will be appreciated by one skilled in the art, aspects of the present invention can be embodied as a system, method or computer program product. Accordingly, aspects of the present invention can take the form of an entirely hardware embodiment, an entirely software embodiment (including firmware, resident software, micro-code, etc.) or one embodiment combining software and hardware aspects that can all generally be referred to herein as a "circuit," "module" or "system." Furthermore, in some embodiments, aspects of the present invention can take the form of a computer program product embodied in one or more computer readable medium(s) having computer readable program code embodied thereon.

Any combination of one or more computer readable medium(s) can be utilized. The computer readable medium can be a computer readable signal medium or a computer readable storage medium. A computer readable storage medium can be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium can include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium can be any tangible medium that can contain, or store a program for use by or in connection with an instruction execution system, apparatus, or device.

A computer readable signal medium can include a propagated data signal with computer readable program code embodied therein, for example, in baseband or as part of a carrier wave. Such a propagated data signal can take any of a variety of forms, including, but not limited to, an electromagnetic signal, optical signal, or any suitable combination thereof. A computer readable signal medium can be any computer readable medium that is not a computer readable storage medium and that can communicate, propagate, or transport a program for use by or in connection with an instruction execution system, apparatus, or device.

Program code embodied on a computer readable medium can be transmitted using any appropriate medium, including but not limited to wireless, wireline, optical fiber cable, RF, etc., or any suitable combination of the foregoing.

Computer program code for carrying out operations for aspects of the present invention can be written in any combination of one or more programming languages, including an object oriented programming language such as Java, Smalltalk, C++ or the like and conventional procedural programming languages, such as the "C" programming language or similar programming languages. The program code can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions can also be stored in a computer readable medium that can direct a computer, other programmable data processing apparatus, or other devices to function in a particular manner, such that the instructions stored in the computer readable medium produce an article of manufacture including instruction means which implements the function/act specified in the flowchart and/or block diagram block or blocks.

The computer program instructions can also be loaded onto a computer, other programmable data processing apparatus, or other devices to cause a series of operational steps to be performed on the computer, other programmable data processing apparatus or other devices to produce a computer implemented process such that the instructions which execute on the computer or other programmable apparatus provide processes for implementing the functions/acts specified in the flowchart and/or block diagram block or blocks.

Referring now to FIG. 1, in which a block diagram of an exemplary computer system/server 12 which is applicable to implement the embodiments of the present invention is illustrated. Computer system/server 12 illustrated in FIG. 1 is only illustrative and is not intended to suggest any limitation as to the scope of use or functionality of embodiments of the invention described herein.

As illustrated in FIG. 1, computer system/server 12 is illustrated in the form of a general-purpose computing device. The components of computer system/server 12 can include, but are not limited to, one or more processors or processing units 16, a system memory 28, and a bus 18 that couples various system components including the system memory 28 and processing units 16.

Bus 18 represents one or more of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media can be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 can further include other removable/non-removable, volatile/non-volatile computer system storage media. By way of example only, storage system 34 can be provided for reading from and writing to a non-removable, non-volatile magnetic media (not illustrated in FIG. 1 and typically called a "hard drive"). Although not illustrated in FIG. 1, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each drive can be connected to bus 18 by one or more data media interfaces. As will be further depicted and described below, memory 28 can include at least one program product having a set (e.g., at least one) of program modules that are configured to carry out the functions of embodiments of the present invention.

Program/utility 40, having a set (at least one) of program modules 42, can be stored in memory 28 by way of example, and not limitation, as well as an operating system, one or more application programs, other program modules, and program data. Each of the operating system, one or more application programs, other program modules, and program data or some combination thereof, can include an implementation of a networking environment. Program modules 42 generally carry out the functions and/or methodologies of embodiments of the present invention as described herein.

Computer system/server 12 can also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not illustrated, other hardware and/or software components can be used in conjunction with computer system/server 12. Examples, include, but are not limited to: microcode, device drivers, redundant processing units, external disk drive arrays, RAID systems, tape drives, and data archival storage systems, etc.

Note FIG. 1 just schematically illustrates a schematic view of a computer system which is applicable to implement the embodiments of the present invention. Those skilled in the art should understand the computer system can be implemented by an existing computer device in a current wind turbine or implemented by introducing an additional computer device, and the present invention can be implemented by an existing computer device in a wind turbine in conjunction with a newly added additional device.

According to an embodiment of the present invention, the generating a corrected data set based on environmental data collected from at least one sensor in the wind farm includes: obtaining at least one of wind information of a plurality of wind turbines in the wind farm and meteorological data within the wind farm; and generating the corrected data set based on at least one of the wind information and the meteorological data.

According to another embodiment of the present invention, the wind information includes wind direction and wind velocity, and the wind direction is obtained based on at least one of: calculating the wind direction based on yaw angle of a wind turbine in the wind farm; calculating the wind direction based on wind direction at a wind tower in the wind farm; obtaining the wind direction based on fluid dynamics analysis; and obtaining the wind direction based on power curve deviation analysis.

Figure 2:
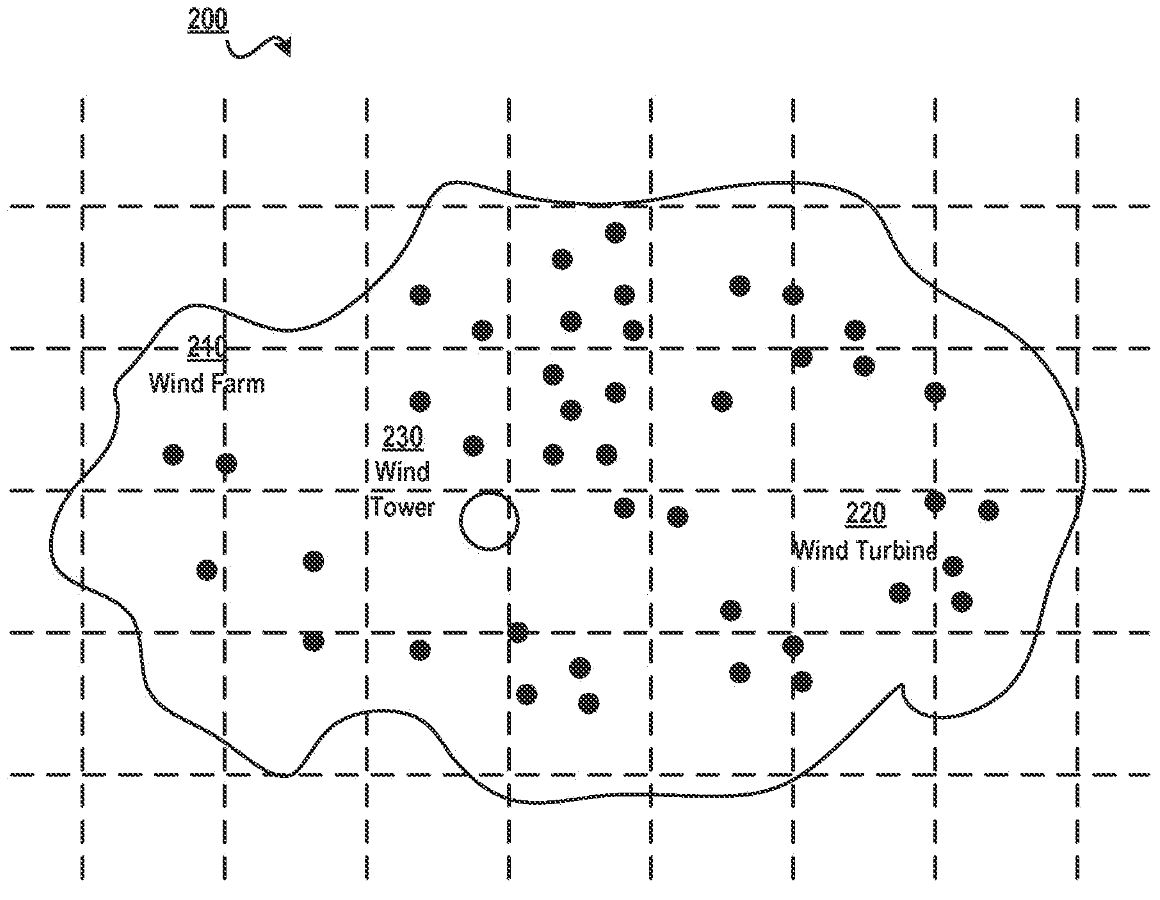
FIG. 2 schematically illustrates a schematic view of forecasting output power of a wind farm based on a weather forecasting model according to one solution.

FIG. 2 schematically illustrates a schematic view 200 of forecasting output power of a wind farm based on a weather forecasting model according to one solution. As illustrated in FIG. 2, a wind farm 210 can consist of a plurality of wind turbines 220 illustrated with black dots; usually these wind turbines are irregularly distributed in areas with rich wind resources, such as plains, sea level and the like. The plurality of wind turbines are discretely distributed within the scope of wind farm 210, and also the shape of the wind farm is usually irregular. In addition, in wind farm 210 there can be deployed one or more (usually, only one in a small wind farm) wind towers 230, on which sensors for monitoring meteorological elements (e.g., temperature, moisture, air pressure, wind velocity and wind direction) within the wind farm can be installed. Typically, sensors can be installed on the wind tower at heights of 10 m, 30 m, 50 m, 70 m, etc.

For simplicity, the above meteorological elements can be called five meteorological elements for short. Those skilled in the art should note although the five meteorological elements are used as a concrete example of meteorological elements in the context of the present invention, the meteorological elements can further include more or less respects according to a concrete application environment demand.

In existing technical solutions, the weather forecasting model being adopted can be a data model that is available to the public for free or by payment, such as the Weather Research and Forecasting (WRF) model developed by the United States National Centers for Environmental Prediction (NCEP) and National Center for Atmospheric Research (UCAR). The Weather Research and Forecasting model is a widely applied forecasting model, and its application interface is open to the public. Those skilled in the art can use this model according to their needs.

The weather forecasting model can be a grid-based model. For example, FIG. 2 illustrates the illustration of the weather forecasting model with a dashed grid. Usually the grid can have different resolutions, e.g., the grid can be 5 km×5 km, 3 km×3 km, or other values. Based on the weather forecasting model, it is possible to represent meteorological elements at different altitudes, e.g., altitudes of 100 m and 300 m from the ground. Note by using the weather forecasting model, only forecast values of meteorological elements at grid points of the grid can be obtained; and due to the interference from complex terrain factors within the wind farm and rotation of blades of various wind turbines to meteorological elements, usually, there are huge discrepancies between the weather forecasting model (coarse resolution) as obtained and the actual situation. Therefore, in the technical solution as illustrated in FIG. 2, large errors will be produced if output power of a specific wind turbine is estimated directly based on the obtained general-purpose weather forecasting model.

To tackle the numerous drawbacks in the prior art, the present invention provides a method and apparatus for forecasting output power of a wind turbine in a wind farm. In the embodiments of the present invention, considering a concrete application environment of the wind farm, it is possible to correct errors in the initial conditions of weather forecasting model by using real-time measured values collected by meteorological sensors disposed at wind towers in the wind farm and a wind velocity sensor disposed at each wind turbine, and further estimate output power of each wind turbine based on a forecast value of wind information at each wind turbine.

By means of the various embodiments of the present invention, the accuracy of power forecasting for a specific wind turbine can be improved significantly, and only data inputs (sensors at wind towers and wind turbines) of existing meteorological element sensors are required but no additional meteorological sensor needs to be installed.

Figure 3:
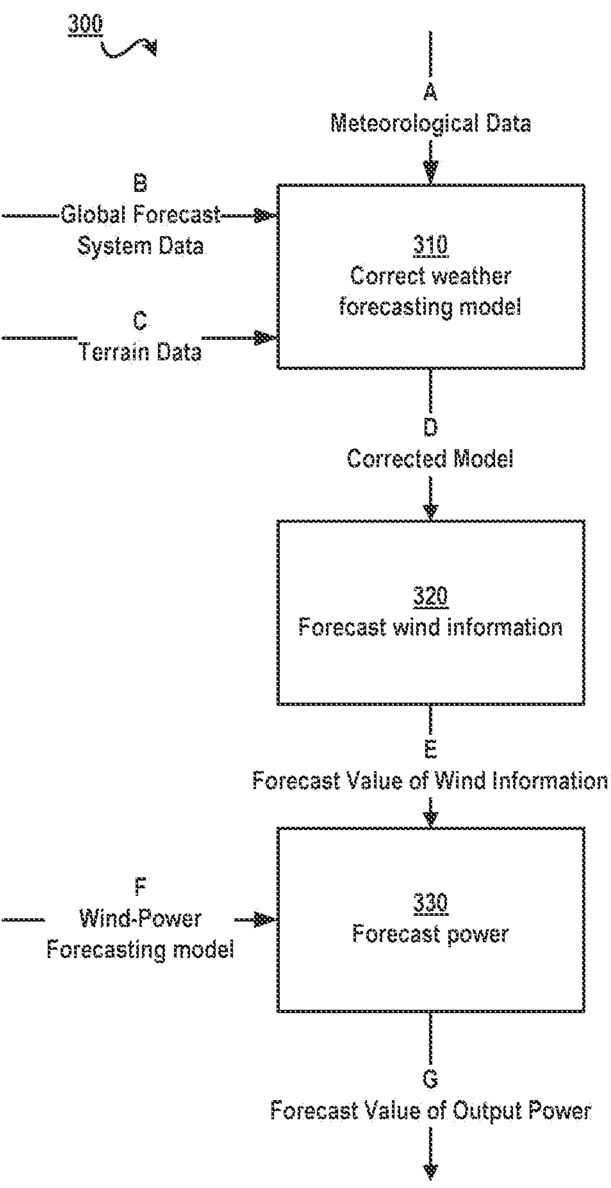
FIG. 3 schematically illustrates an architecture diagram of a technical solution of forecasting output power of a wind turbine in a wind farm according to one embodiment of the present invention.

FIG. 3 schematically illustrates an architecture diagram 300 of a technical solution for forecasting output power of a wind turbine in a wind farm according to one embodiment of the present invention. As illustrated in FIG. 3, in block 310 a weather forecasting model is corrected based on environmental data (as illustrated by arrow A), wherein the weather forecasting model is generated based on, e.g. Global Forecast System (GFS) data (as illustrated by arrow B) and terrain data (as illustrated by arrow C).

Through correction in block 310, wind information can be forecast based on the corrected weather forecasting model (as illustrated by arrow D) in block 320. Note here the wind information forecasting refers to forecasting wind information at a specific wind turbine in the wind farm, which specific wind turbine can be any wind turbine in the wind farm. Those skilled in the art can understand the model as illustrated by arrow D is a weather forecasting model that has been corrected using in-situ meteorological data in the wind farm for the initial forecasting stage, so wind information at a specific wind turbine in the wind farm can be accurately generated based on the model in the following time.

In the embodiments of the present invention, those skilled in the art can further generate a forecast value of wind information for a specific wind turbine (including a wind turbine that is located or not located at a grid point of the weather forecasting model) based on knowledge in the weather forecast field in conjunction with concrete properties of wind turbines, e.g. using interpolation and approximation methods. In one embodiment of the present invention, power output of a wind turbine can rely on wind velocity information at the wind turbine; a forecast value of wind information at the hub-height of the wind turbine can be generated in order to reveal power output of the wind turbine more accurately.

With reference to the above content with respect to blocks 310 and 320, wind information at a specific wind turbine in the wind farm can already be forecast. Next, in block 330 a forecast value (as illustrated by arrow G) of output power can be calculated using the forecast value (as illustrated by arrow E) of the wind information and based on a wind-power forecasting model (as illustrated by arrow F). In this embodiment, based on the difference in variables in the forecasting model, the wind information can further include wind velocity information, or include both wind velocity and wind direction.

Based on the architecture as illustrated in FIG. 3, meteorological elements that are observed in real time in the wind farm can be used to improve the general-purpose weather forecasting model and to make it more suitable to forecast wind information at a specific location. In this embodiment, the specific location and a hub-height location of a certain wind turbine can be represented using, for example, three-dimensional coordinates (longitude, latitude, altitude).

Based on the architecture as illustrated in FIG. 3, one embodiment of the present invention provides a method for forecasting output power of a wind turbine in a wind farm, comprising: generating a corrected data set based on environmental data collected from at least one sensor in the wind farm; correcting a weather forecasting model by using the corrected data set; obtaining a forecast value of wind information at the wind turbine based on the corrected weather forecasting model; and forecasting the output power of the wind turbine based on the forecast value and a power forecasting model.

Figure 4:
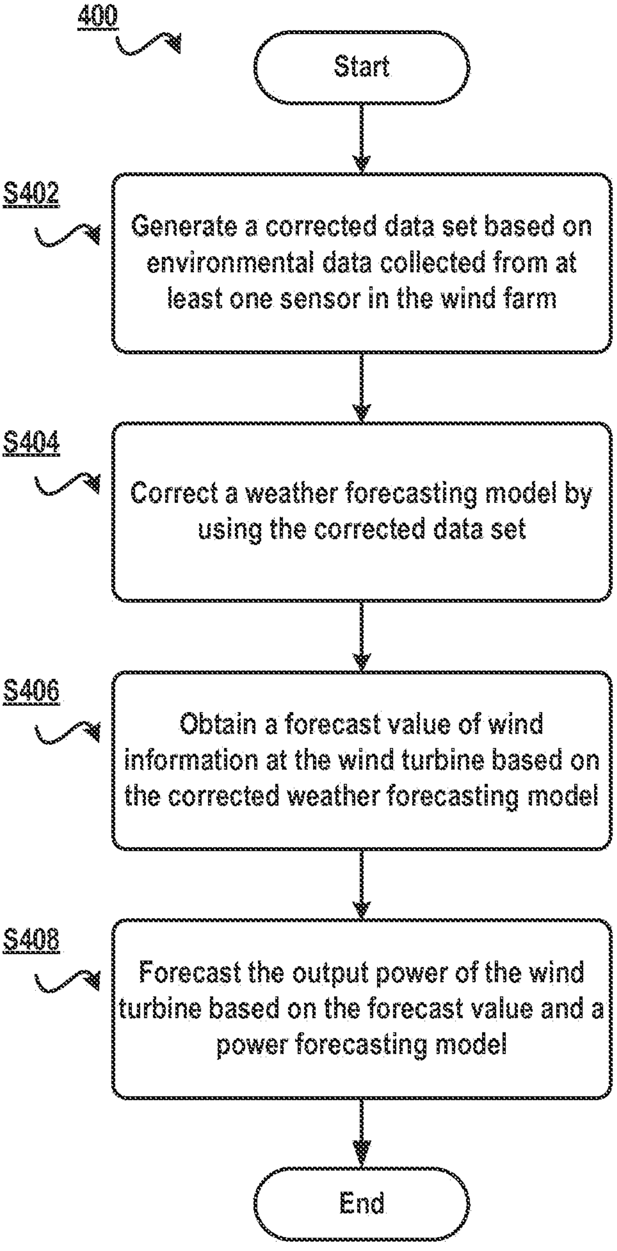
FIG. 4 schematically illustrates a flowchart of a method for forecasting output power of a wind turbine in a wind farm according to one embodiment of the present invention.

FIG. 4 schematically illustrates a flowchart 400 of a method for forecasting output power of a wind turbine in a wind farm according to one embodiment of the present invention. Specifically, in step S402 a corrected data set is generated based on environmental data collected from at least one sensor in the wind farm. Note in this embodiment the sensors are existing sensors in the wind farm, such as meteorological sensors at a wind tower in the wind farm and wind velocity sensors at wind turbines in the wind farm.

Note usually a meteorological sensor at a wind tower can measure various aspects of meteorological elements, including without limitation temperature, moisture, air pressure, wind velocity and wind direction. Since only one (or more) wind tower is installed at a typical location in one wind farm, data from a meteorological sensor at a wind tower is rather limited. In the embodiments of the present invention, it is desired to forecast wind information at the hub-height of a specific wind turbine, so it is helpful to directly use wind information measured at the wind turbine.

Note usually a sensor installed at a wind turbine can measure only wind velocity information. Although the sensor can measure a relative relationship between wind direction and yaw orientation of a current wind turbine, the sensor cannot directly measure wind direction information. Hereinafter detailed description will be presented to how to calculate hub-height wind direction information of a wind turbine without additionally disposing a wind direction sensor.

In step S404 a weather forecasting model initial condition is corrected by using the corrected data set. In an application environment of the present invention, Numerical Weather Prediction (NWP) is a currently popular approach, whose emergence entirely changes the legacy situation of predicting weather changes based on artificial experience, and thereby promotes the level from "Subjective Forecast" to "Objective Forecast" and provides forecasts with higher temporal and spatial resolution.

As in recent years high performance computers and parallel computing technology have developed and weather models, physical process parameterization and its algorithms have been perfected constantly, the spatial resolution of Numerical Weather Prediction has been improved from dozens of kilometers to under 1 km. However, as wind turbines are discretely distributed in large scope, the resolution of 1 km still does not meet the requirement for forecasting output power of a specific wind turbine. Power forecasting for a specific wind turbine lays special requirements on a result of Numerical Weather Prediction. For example, wind velocity at the hub-height of a wind turbine that is as precise as 70 m from the ground is required; the average spacing of each wind turbine is less than 500 m, so a higher model resolution is required; observed elements and distribution structure of measured data do not satisfy conventional meteorological data standards and thus cannot be used directly, etc. Therefore, it is necessary to use measured data at the wind turbine to further correct the weather forecasting model. In the various embodiments of the present invention, multiple data members in the corrected data set as constructed in step S402 can be used to correct the weather forecasting model in several rounds.

Next, in step S406 a forecast value of wind information at the wind turbine is obtained based on the corrected weather forecasting model. By using the corrected weather forecasting model initial condition, a forecast value of wind information at a specific location (e.g., specified by longitude, latitude and altitude) within the wind farm scope can be obtained.

In step S408 the output power of the wind turbine is forecast based on the forecast value and a power forecasting model. According to the definition of Wind Turbine Power Curve Verification Standard issued by the International Electrotechnical Commission (IEC 61400-12), the power curve of a wind turbine is a relational curve that output power of a wind turbine varies with 10 minutes' average wind velocity. Usually the power curve of a wind turbine not only indicates a relationship between wind velocity and power but also reveals many factors that affect the power curve.

Although the output power of the wind turbine will be affected by conditions such as parameters of the wind turbine itself, air density and wind velocity, wind velocity is the most important factor. Therefore, the output power of a specific wind turbine can be calculated based on a power forecasting model associated with hub-height wind velocity at the wind turbine.

In one embodiment of the present invention, the generating a corrected data set based on environmental data collected from at least one sensor in the wind farm comprises: obtaining at least one of wind information of a plurality of wind turbines in the wind farm and meteorological data within the wind farm; and generating the corrected data set based on at least one of the wind information and the meteorological data. In one embodiment of the present invention, the at least one sensor comprises at least any of a meteorological sensor at a wind tower in the wind farm and a wind velocity sensor at a wind turbine in the wind farm.

Further note in this embodiment, data members in the "corrected data set" can comprise two aspects of content: meteorological data from a meteorological sensor at a wind tower, e.g. represented by a quintuple (temperature, moisture, air pressure, wind velocity, and wind direction); and measured data from a sensor at each wind turbine. Wind information that is obtained after processing the measured data can further be comprised, e.g. represented by data structure as illustrated in Table 1 below.

TABLE 1

| No. | Wind Turbine ID | Wind Information |
|---|---|---|
| 1 | Turbine-1 | (wind direction −1, wind velocity −1) |
| 2 | Turbine-2 | (wind direction −2, wind velocity −2) |
| . . . | . . . | . . . |

Note only a concrete example of data members in the corrected data set is illustrated here for purposes of illustration, and those skilled in the art can design other data structure based on a concrete application environment, e.g. add "timestamp" to data members.

In one embodiment of the present invention, the wind information comprises wind direction and wind velocity, and the wind direction is obtained based on at least one of: calculating the wind direction based on yaw angle of a wind turbine in the wind farm; calculating the wind direction based on wind direction at a wind tower in the wind farm; obtaining the wind direction based on fluid dynamics analysis; and obtaining the wind direction based on power curve deviation analysis.

Note while correcting the weather forecasting model, information on both wind direction and wind velocity is required. However, as the sensor at a wind turbine comprises only an anemometer but not for wind direction, data without wind direction is insufficient to provide support for correction later, and further the corrected data set cannot be constructed by directly using measured data from the sensor at the wind turbine. In the embodiments of the present invention, analysis can be carried out in various cases.

For example, the wind direction can be calculated based on yaw angle of a wind turbine in the wind farm. Note a yaw sensor at the wind turbine usually can measure a relative relationship between current wind direction and yaw orientation of the wind turbine, so absolute wind direction can be estimated based on "yaw wind direction." Since large errors can be caused due to mutual interference between wind turbines, in the embodiments of the present invention yaw wind direction can be corrected so as to obtain hub-height wind direction at a specific wind turbine.

For example, the wind direction can be calculated based on wind direction at a wind tower in the wind farm. This method is suitable to wind farms located at flat terrain (e.g., plains). Based on the supposition of balance between upstream and downstream wind direction, the observed wind direction at the wind tower can be directly regarded as the wind direction at a specific wind turbine. In this environment, as the airflow within the entire wind farm is stable, the wind direction at the wind tower coincides with the wind direction at each wind turbine and thus can be used as the wind direction at each wind turbine. For wind farms with consistent terrain conditions, this method can greatly simplify the calculation step. However, as terrain exerts a considerable impact on wind turbines at different locations, this method cannot be put into wide application.

For example, the wind direction can be obtained based on fluid dynamics analysis. For a wind farm at complicated terrain (e.g., mountains, hills, canyons), wind velocity and wind direction at various wind turbines within the wind farm are greatly affected by terrain and thus have large intra-farm difference. A Computational Fluid Dynamics (CFD) model can be introduced to the wind farm terrain. With physical constraints and diagnostic equation of the CFD model, the wind direction information of the entire wind farm is inverted through wind velocity and wind direction information of several wind towers, and the wind direction resulted from the inversion is corrected according to historical data and yaw wind direction data.

For another example, the wind direction can be obtained based on actual wind turbine power and theoretical power curve deviation analysis. In the wind power generation field, lots of experience has been accumulated regarding reverse-deriving wind information at a wind turbine from yaw information and actual output power of a generator. Therefore, the wind direction information can be obtained based on these empirical formulas and historical statistical data.

In one embodiment of the present invention, the correcting a weather forecasting model by using the corrected data set comprises: correcting a weather forecasting model by using the corrected data set according to a Hybrid Data Assimilation method.

In the weather forecast field, Hybrid Data Assimilation is a method for correcting a weather forecasting model by using meteorological data observed at professional meteorological observatory & station to reduce the errors of model initial conditions. The method provides data processing for the Numerical Weather Prediction model and currently is widely applied in the weather forecast field. Hybrid Data Assimilation can introduce into the weather forecasting model meteorological data measured values that come from various sources and with different errors and different temporal-spatial resolutions. By seeking the optimal solution between model solutions and actual measured values and using the optimal solution as an initial field of the weather forecasting model, Hybrid Data Assimilation achieves correction of the weather forecasting model.

Compared with traditional assimilation methods, Hybrid Data Assimilation can provide optimization to a large extent, i.e., take into consideration physical structure of current flow field while keeping the stability of convergence. Therefore, the introducing of Hybrid Data Assimilation has bright application prospects for single wind turbine forecasting in a small, high-precision wind farm.

Therefore, a method for introducing meteorological data observed by sensors within a wind farm to a weather forecasting model is adopted in the embodiments of the present invention. How to construct the corrected data set has been described above, and content of data members in the corrected data set has been illustrated by using as an example quintuples comprising meteorological elements and the wind information at wind turbines as illustrated in Table 1. Note although the corrected data set contains a number of data members, not all data members are required for correction. In addition, the sequence that various data members are applied for correction exerts some impact on the accuracy of the weather forecasting model.

In one embodiment of the present invention, the correcting a weather forecasting model by using the corrected data set comprises: selecting at least one data member from the corrected data set; correcting the weather forecasting model based on one of the at least one data member in each of at least one round.

Therefore, the most typical data members should be selected from the corrected data set during correction, and these selected data members can be sorted. Then, the selected data members are applied in sequence in multiple rounds, wherein in each round one data member is applied to correct a weather forecasting model resulting from the previous correction.

In one embodiment of the present invention, the selecting at least one data member from the corrected data set comprises: filtering data members in the corrected data set according to grid point information in the weather forecasting model.

Note meteorological data obtained at the wind tower can comprise more meteorological elements. Thus, priority is given to selecting from the corrected data set meteorological data from one or more wind towers, and then wind information data (e.g., as illustrated in Table 1) at the hub-height of the wind towers is filtered. While selecting from the multiple data members as illustrated in Table 1, wind information of one or more wind turbines that best match grid points in the weather forecasting model can be selected.

Specifically, selection can be performed to masses of observed data by means of spatial area average and local variance check. For example, for a specific weather model resolution (depending on the input and computing performance of hardware, the resolution can vary among various wind farms, such as 167 m, 500 m or 1500 m), a matching wind turbine (the number of observed wind turbines within the model grid is no more than 3) is found, and the observed data is subjected to spatially sequential disturbance during data assimilation, so as to avoid the fact that, data assimilation (i.e., conditioned minimization) converges on a certain local minimum rather than a global minimum because data from a certain area is introduced frequently. In this manner, a correct optimization result can be obtained efficiently.

Specifically, the present invention proposes a method for super observation, which is a method for filtering data members that are redundant in the density (spatial) or frequency (temporal) respect. The method selects a part of "super observed values" from all data members for constructing the corrected data set. By means of the method, high-quality observed values can be found and representative errors of data members can be reduced. In the context of the present invention, representative errors are errors caused by data and the mode due to difference in temporal-spatial resolution.

In the context of the present invention, since data collected at wind turbines is spatially dense and greater than the resolving ability of weather model, redundant data members should be removed spatially. Specifically, a data thinning method, a space averaging method and a variance removal method can be used, or they are used in combination.

1. Data thinning method: a part is selected from all observed data (too dense). For example, regarding wind turbines at intervals of 200 m, one wind turbine value every 1 km is taken as a super observed value.

2. Space averaging method: observed data from all wind turbines within certain spatial scope is averaged, and then a mean is used as a candidate member of the corrected data set.

3. Variance method: on the basis of the averaging method, first space averaging is carried out and a mean ($X_{mean}$) and a standard difference value ($X_{std}$) are calculated, and then all data members within the space are filtered. For example, regarding an observed value $X_i$ of a specific wind turbine, if $X_i - X_{mean} > 3 \times X_{std}$ then the data member is removed. Next, remaining data members are used to re-calculate a mean as super observation. On the basis of method 2, method 3 can remove the deviation impact of abnormal values.

In one embodiment of the present invention, the correcting the weather forecasting model based on one of the at least one data member in each of at least one round further comprises: sorting the at least one data member according to dependency in the at least one data member in the corrected data set; and using each of the at least one data member to correct the weather forecasting model sequentially.

A basic supposition of Hybrid Data Assimilation is that all data members in the corrected set are independent from one another. In the traditional weather forecast industry, strict regulations are laid down on observed elements and spatial distribution of standard meteorological observation stations (national meteorological bureaus and the World Meteorological Organization), so that meteorological data collected at each observation station can be directly used for correcting the weather forecasting model. However, as a wind farm is usually located in a remote area and cannot be covered by a conventional meteorological observation station, only observed data within the wind farm can be used.

Nevertheless observed data at wind turbines are necessarily spatially related, and wind information at a specific wind turbine in a wind farm can get interfered by surrounding terrain and/or rotation of other wind turbines' blades, so various members in the corrected data set can be dependent on one another. For example, dependency between two wind turbines that are spatially close to each other (e.g., spacing is less than 500 m) is greater than dependency between two wind turbines that are spatially far away from each other (e.g., spacing is more than 5 km). Hence, it becomes a critical step of correction regarding how to remove redundant information from the corrected data set and keep independency of data members.

Therefore, dependencies in various wind turbines in the wind farm can be calculated, and data members can be sorted based on the dependencies, and subsequently correction is carried out in rounds according to the sequence resulting from the sorting. The above dependencies can be calculated based on various factors, e.g., including the similarity in surrounding terrain of wind turbines, the mutual interference in wind turbines, the distance between wind turbines, etc. For simplicity, it can be considered the distance between wind turbines is a major factor that affects the dependency.

The principle of sorting is to disrupt the sequence of data members in the corrected data set so that the correlation in various data members caused by spatial vicinity can be reduced every time data assimilation is conducted. Specifically, for data members associated with an adjacent wind turbine, the original sequence (e.g., wind turbines F001, F002, F003, F004, F005) of various data members can be disrupted using a random number generating algorithm, and data members in the corrected data set is re-sorted (e.g., wind turbines F003, F001, F005, F002, F004) according to the random number algorithm, so as to improve the correction quality.

Further note in the embodiments of the present invention it is not intended to limit when to execute the sorting step. For example, the sorting step can be executed after completion of the construction of the corrected data set; or to improve the operation efficiency, only selected data members are sorted after the corrected data set has been filtered.

In one embodiment of the present invention, the weather forecasting model is extracted from terrain data and Global Forecast System data associated with an area where the wind farm is located.

Note the weather forecasting model can be extracted based on global terrain data and meteorological data of the Global Forecast System (GFS). The GFS is a Numerical Weather Prediction model published by the United States National Oceanic and Atmospheric Administration (NOAA), whose data format is open to the public. Hence, those skilled in the art can extract desired content from this model and form the weather forecasting model in conjunction with terrain data of an area where the wind farm is located. Terrain data is, for example, Digital Elevation Model (DEM) data.

Figure 5:
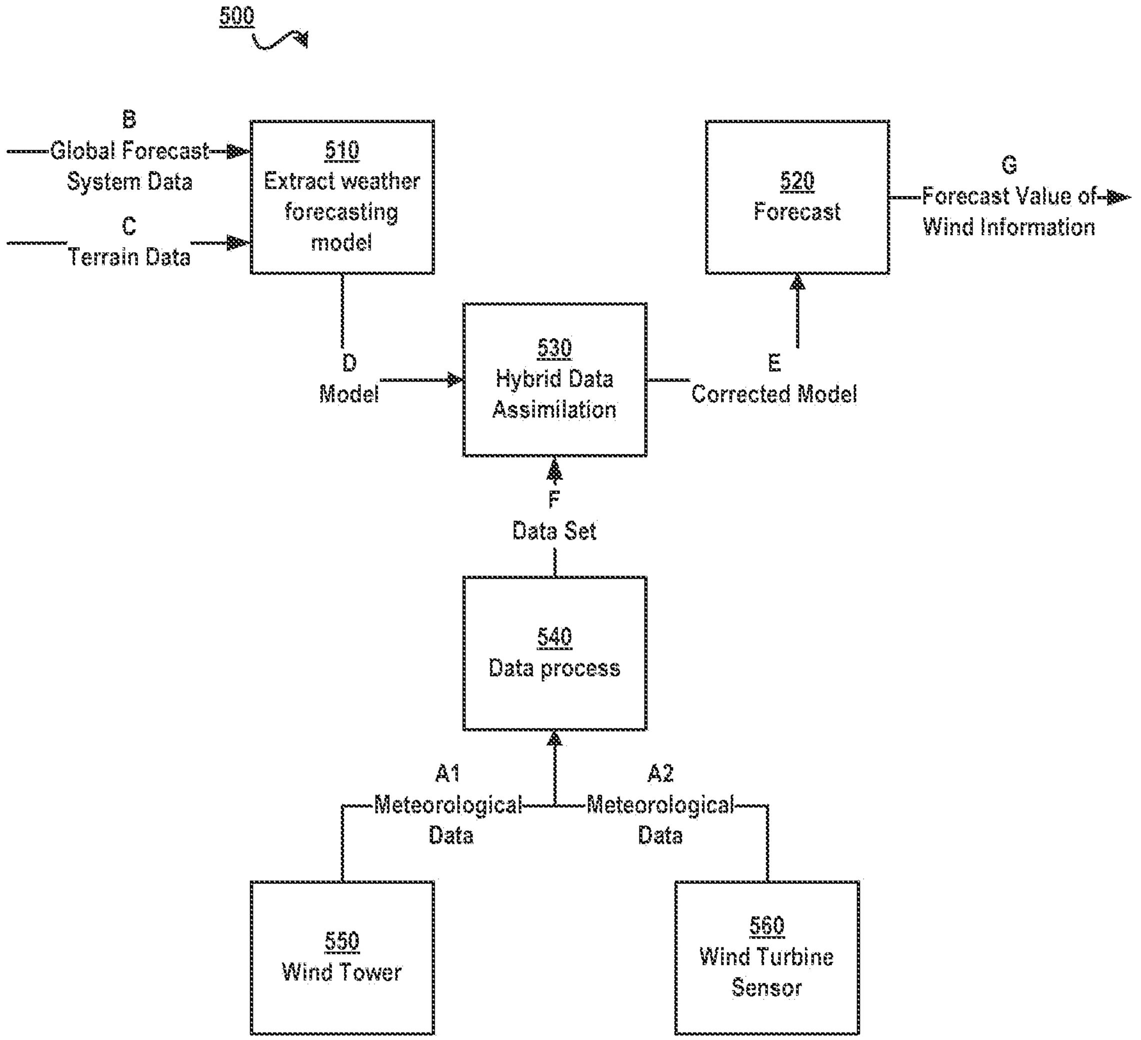
FIG. 5 schematically illustrates an architecture diagram of forecasting wind information at a wind turbine in a wind farm according to one embodiment of the present invention.

With reference to FIG. 5, detailed description will be presented below to the data flow during forecasting output power of a wind turbine. FIG. 5 schematically illustrates an architecture diagram 500 for forecasting wind information at a wind turbine in a wind farm according to one embodiment of the present invention. As illustrated in FIG. 5, a data processing module illustrated in block 540 can comprise two inputs: meteorological data (as illustrated by arrow A1) from a wind tower 550, for example, including five meteorological elements collected at different heights of the wind tower; and wind velocity information (or further including yaw wind direction or wind direction information) from a wind turbine sensor 560. Through the processing in block 540, a corrected data set used for Hybrid Data Assimilation can be generated.

In block 510, a weather forecasting model is extracted by reading Global Forecast System data (as illustrated by arrow B) and terrain data (as illustrated by arrow C), at which point the extracted model is an original weather forecasting model (as illustrated by arrow D). Note the processing in blocks 510 and 540 can be executed in series or in parallel, and the sequence that the two processing is executed is not limited in the context of the present invention.

In block 530, the original weather forecasting model (as illustrated by arrow D) is corrected using a Hybrid Data Assimilation method based on data from a corrected data set (as illustrated by arrow F), and the corrected weather forecasting model is outputted to block 510. Finally in block 520, a forecast value (as illustrated by arrow G) of wind information at a specific wind turbine can be provided using the corrected weather forecasting model.

In one embodiment of the present invention, the power forecasting model is at least one of: a power curve of the wind turbine; and a function related to properties of the wind turbine, air density and the forecast value.

Figure 6:
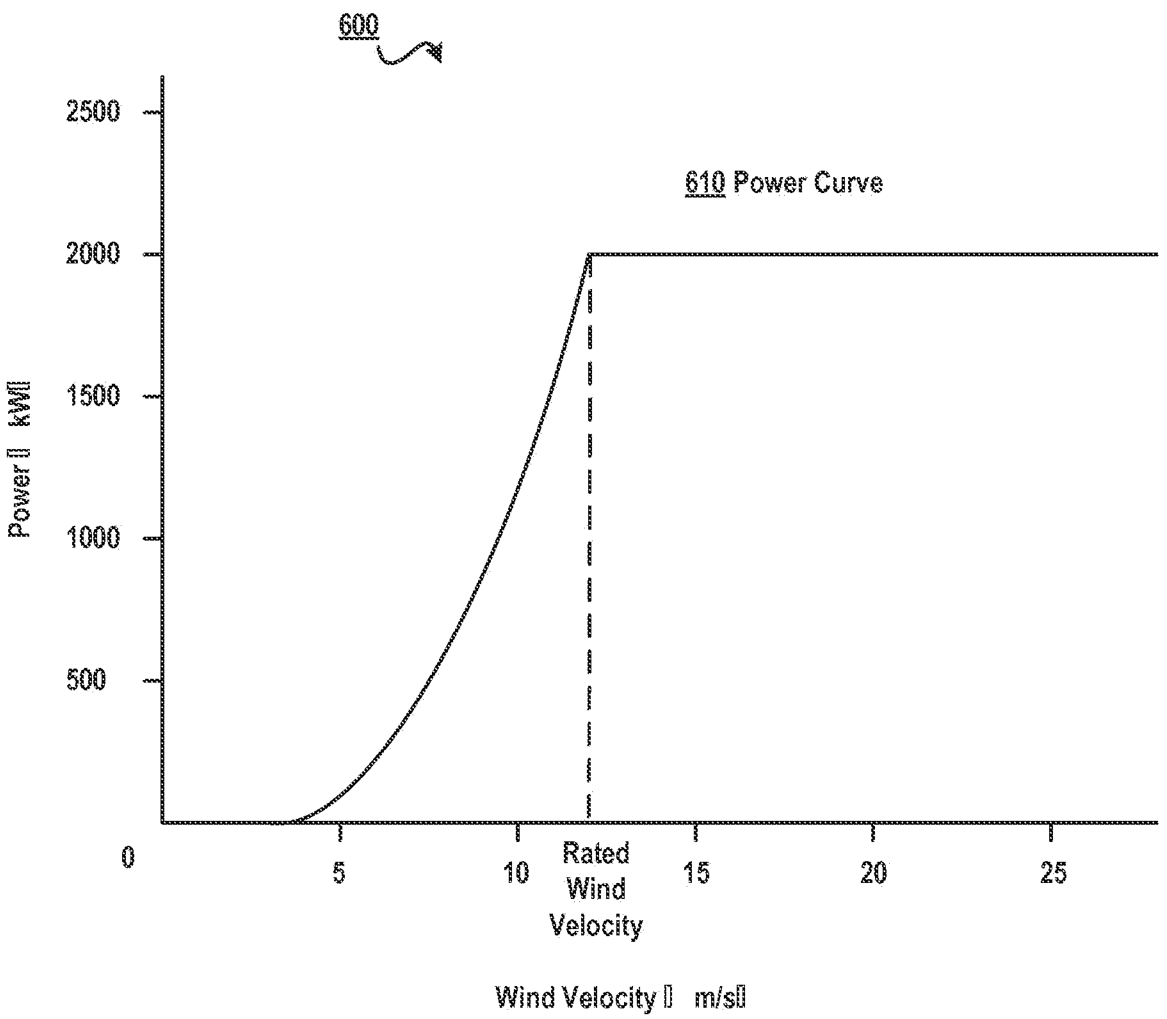
FIG. 6 schematically illustrates a curve view of a relationship between wind velocity and output power of a wind turbine according to one embodiment of the present invention.

FIG. 6 schematically illustrates a power curve 610 view 600 of a relationship between wind velocity and output power of a wind turbine according to one embodiment of the present invention, wherein the horizontal axis represents hub-height wind velocity at the wind turbine and the vertical axis represents output power of the wind turbine. When the hub-height wind velocity is between 0 and a rated value, the output power gradually increases like the curve as illustrated in FIG. 6; when the hub-height wind velocity exceeds the rated value, the output power keeps steady. The power curve can be provided by a manufacturer of the wind turbine or obtained from fitting of historical wind velocity and power of the wind turbine. By means of the power curve as illustrated in FIG. 6, the output power of a specific wind turbine can be forecast based on a forecast value of hub-height wind velocity at the wind turbine.

In one embodiment of the present invention, alternatively a physical method can be adopted, i.e., output power of a specific wind turbine is directly calculated according to forecast meteorological elements (wind velocity, temperature, air pressure, etc.) of the weather forecasting model. As based on an atmospheric dynamics forecast result, the physical method has the capability of long-time forecast. For example, forecasting can be conducted based on a function related to properties of the wind turbine, air density and the forecast value. As an example, output power of a wind turbine can be calculated based on the equation below:

$$P = \frac{1}{2} C_p A \rho V^3 \eta$$

Where P is output power of a wind turbine; $C_p$ is a power coefficient of the wind turbine; A is a swept area of the wind turbine; ρ is air density; Vis wind velocity at the hub-height of the wind turbine; and η is efficiency of the wind turbine that is the product of mechanical efficiency and electric power of the wind turbine.

Alternatively, a statistical method can further be used for forecasting. For example, relational structure and a statistical model are established using historical meteorological elements (temperature, moisture, air pressure, etc.) and wind turbine electricity generating power data, and then future output power is estimated by the statistical model. The statistical model can use different models, such as a time-series regression model, a BP neural network model, a support vector machine, etc. The forecast error of various models varies depending on different temporal and spatial environments. Those skilled in the art can select a concrete model according to parameters of an application environment.

In addition, to ensure the stability of forecasting, a method for multi-model combination forecasting can be adopted, wherein a mean or weighted mean is calculated in view of forecast results of various statistical models. Since the statistical method is based on historical data, a good result will be produced for forecasting of recent moments (e.g., 0-3 hours); however, a forecast result for a long time (e.g., 24-48 hours) has large calculation error due to non-linear characteristics of atmospheric motion.

Alternatively, a hybrid method can be adopted, i.e., the physical method and the statistical method are combined and given different weights in different forecast periods.

Figure 7:
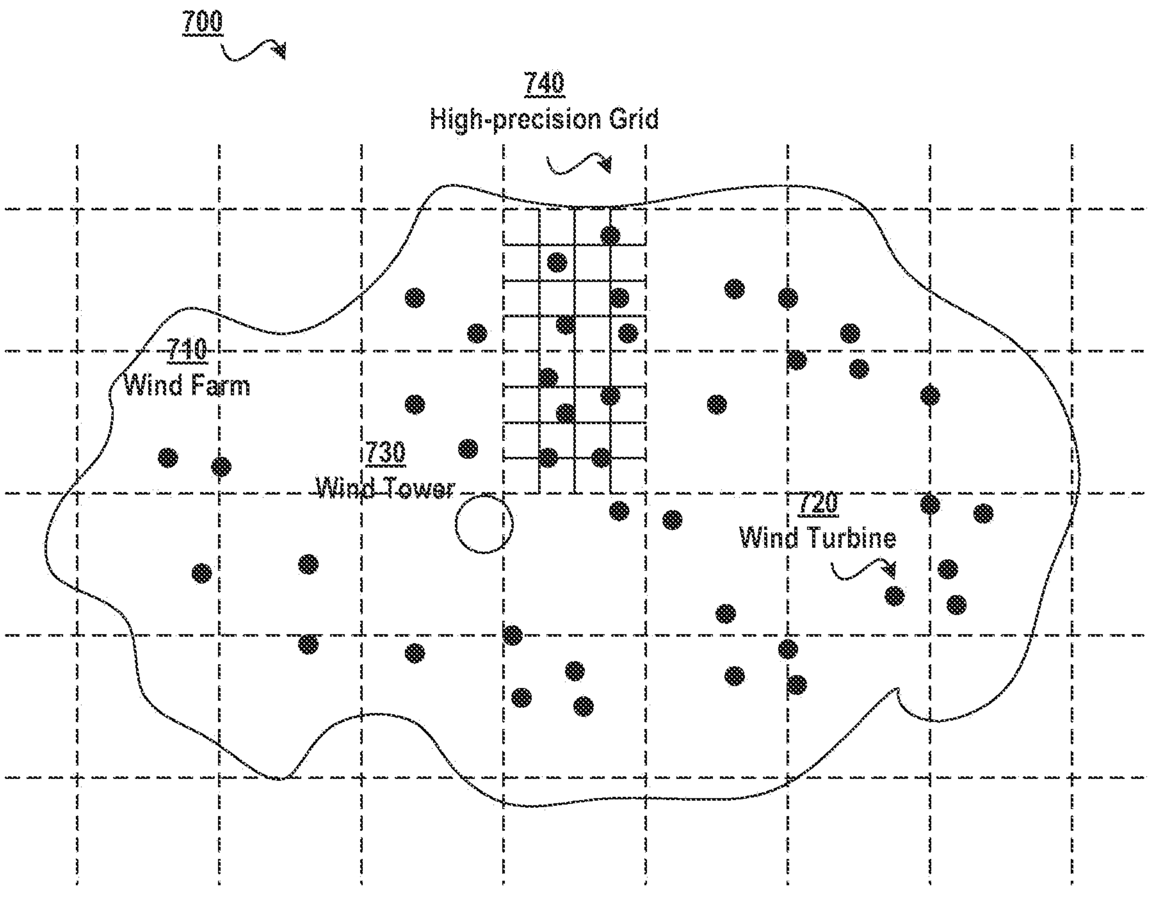
FIG. 7 schematically illustrates a schematic view of generating a forecast value of wind information at a specific wind turbine according to one embodiment of the present invention.

Referring to FIG. 7, due to special characteristics of a wind farm 710 itself, special requirements are imposed on wind information at each wind turbine 720 in the wind farm. As spacing between wind turbines is usually less than 500 m, high-precision forecast values should be provided. In addition, the deployment of wind turbines depends on terrain factors and in some areas can be distributed in a panhandle area, and accordingly, a model grid resolution higher than 1 km at least is required. However, if the entire wind farm is covered with a grid having a resolution of 1 km×1 km or higher, the computational amount is amazingly huge. Based on special characteristics of the distribution of wind turbines, the present invention proposes a terrain-following nested grid technique, which provides a higher grid resolution in areas where wind turbines are concentrated and provides a lower grid resolution where wind turbines are sparsely distributed. This method can reduce the computational amount and ensure that a enough precise forecast result can be obtained at each wind turbine.

FIG. 7 schematically illustrates a schematic view 700 of generating a forecast value of wind information at hub-height of a specific wind turbine according to one embodiment of the present invention. FIG. 7 includes a high-precision grid 740 with at least one wind farm 710, at least one wind tower 730 and at least one wind turbine 720. Suppose the resolution of a dashed grid in FIG. 7 is 4 km×4 km, and the resolution does not satisfy the precision of wind information forecast. Therefore, by reading location information of wind turbines in the wind farm, the grid is refined to 4×4 grids (1 km×1 km for each) with a higher resolution in areas where wind turbines are concentrated, so as to generate higher-precision forecast values of wind information. With this method, on the one hand the precision of wind information forecast values at a specific wind turbine can be improved, and on the other hand, the computational amount of wind information at hundreds of or even more wind turbines in the entire wind farm can be controlled.

Figure 8:
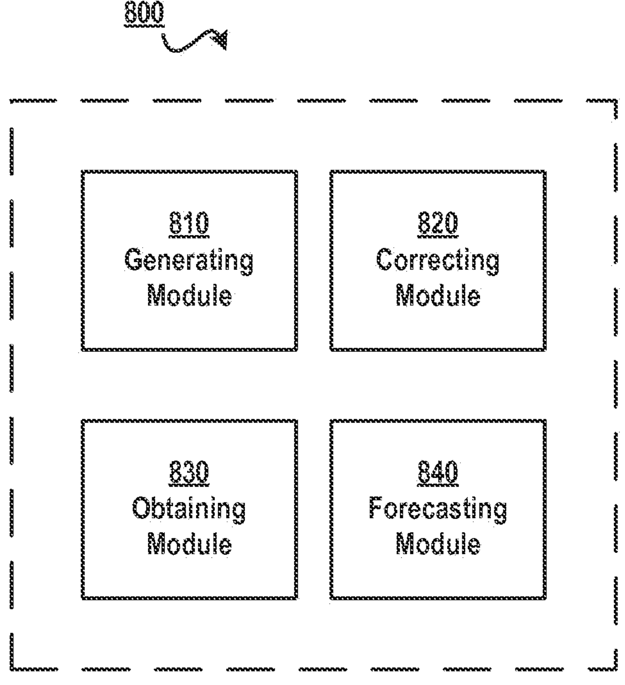
FIG. 8 schematically illustrates a block diagram of an apparatus of forecasting output power of a wind turbine in a wind farm according to one embodiment of the present invention.

FIG. 8 schematically illustrates a block diagram 800 of an apparatus for forecasting output power of a wind turbine in a wind farm according to one embodiment of the present invention. Specifically, FIG. 8 illustrates an apparatus for forecasting output power of a wind turbine in a wind farm, comprising: a generating module 810 configured to generate a corrected data set based on environmental data collected from at least one sensor in the wind farm; a correcting module 820 configured to correct a weather forecasting model by using the corrected data set; an obtaining module 830 configured to obtain a forecast value of wind information at the wind turbine based on the corrected weather forecasting model; and a forecasting module 840 configured to forecast the output power of the wind turbine based on the forecast value and a power forecasting model.

According to another embodiment of the present invention, the generating module comprises: an information obtaining module configured to obtain at least one of wind information of a plurality of wind turbines in the wind farm and meteorological data within the wind farm; and a data generating module configured to generate the corrected data set based on at least one of the wind information and the meteorological data.

According to another embodiment of the present invention, the wind information comprises wind direction and wind velocity, and the information obtaining module comprises: a first module configured to calculate the wind direction based on yaw angle of a wind turbine in the wind farm; a second module configured to calculate the wind direction based on wind direction at a wind tower in the wind farm; a third module configured to obtain the wind direction based on fluid dynamics analysis; and a fourth module configured to obtain the wind direction based on power curve deviation analysis.

By means of the technical solutions described by the various embodiments of the present invention, it can efficiently make use of measurements by various meteorological sensors within the wind farm, and forecast, with the least changes to the wind turbine within the wind farm, the output power of a specific wind turbine during a specific future period more accurately. Further, by means of the technical solutions of the various embodiments of the present invention, it can provide forecast values of the output power of the wind turbine during the 0.about.48 hours or even more, such that technical staffs in the power plant or the power grid can adjust integration planning and operation status of respective wind turbines within the power plant based on the forecast values.

In one embodiment of the present invention, generating module 810 comprises: an information obtaining module configured to obtain at least one of wind information of a plurality of wind turbines in the wind farm and meteorological data within the wind farm; and a data generating module configured to generate the corrected data set based on at least one of the wind information and the meteorological data.

In one embodiment of the present invention, the wind information comprises wind direction and wind velocity, and the information obtaining module comprises: a first module configured to calculate the wind direction based on yaw angle of a wind turbine in the wind farm; a second module configured to calculate the wind direction based on wind direction at a wind tower in the wind farm; a third module configured to obtain the wind direction based on fluid dynamics analysis; and a fourth module configured to obtain the wind direction based on power curve deviation analysis.

In one embodiment of the present invention, the correcting module comprises: a data assimilating module configured to correct the weather forecasting model by using the corrected data set according to a Hybrid Data Assimilation method.

In one embodiment of the present invention, correcting module 820 comprises: a selecting module configured to select at least one data member from the corrected data set; and a first correcting module configured to correct the weather forecasting model based on one of the at least one data member in each of at least one round.

In one embodiment of the present invention, the selecting module comprises: a filtering module configured to filter data members in the corrected data set according to grid point information in the weather forecasting model.

In one embodiment of the present invention, the first correcting module comprises: a sorting module configured to sort the at least one data member according to dependence in the at least one data member in the corrected data set; and a second correcting module configured to use each of the at least one data member to correct the weather forecasting model sequentially.

In one embodiment of the present invention, the weather forecasting model is extracted from terrain data and Global Forecast System data associated with an area where the wind farm is located.

In one embodiment of the present invention, the at least one sensor comprises at least any of a meteorological sensor at a wind tower in the wind farm and a wind velocity sensor at a wind turbine in the wind farm.

In one embodiment of the present invention, the power forecasting model is at least one of: a power curve of the wind turbine; a function related to properties of the wind turbine, air density and the forecast value.

The flowchart and block diagrams in the Figures illustrate the architecture, functionality, and operation of possible implementations of systems, methods and computer program products according to various embodiments of the present invention. In this regard, each block in the flowchart or block diagrams can represent a module, segment, or portion of code, which comprises one or more executable instructions for implementing the specified logical function(s). It should also be noted that, in some alternative implementations, the functions noted in the block can occur out of the order noted in the figures. For example, two blocks illustrated in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A method comprising:

generating a wind turbine weather forecasting model associated with one or more wind power generation assets based on Global Forecast System data associated with the one or more wind power generation assets and terrain data associated with the one or more wind power generation assets;

collecting sensor measurements in real time at the one or more wind power generation assets at a first time, the sensor measurements being collected from meteorological sensors located at the one or more wind power generation assets, the sensor measurements being related to weather at the one or more wind power generation assets, the one or more wind power generation assets including at least one of a wind tower, and a first wind turbine, the one or more wind power generation assets being proximate to each other;

generating a corrected data set based on a subset of the collected sensor measurements, the generating being based on spatial location of the one or more wind power generation assets, wherein the corrected data set comprises location-specific meteorological corrections that compensate for terrain effects at each spatial location;

correcting the wind turbine weather forecasting model for a second wind turbine based on the corrected data set to generate a first weather forecast for the second wind turbine, the second wind turbine not being proximate to the one or more wind power generation assets, wherein correcting comprises applying the location-specific meteorological corrections to account for spatial variations in weather conditions between the proximate one or more wind power generation assets and the non-proximate second wind turbine;

correcting the wind turbine weather forecasting model for the second wind turbine to forecast power at the second wind turbine at least 10 minutes after the first time; and forecasting output power of the second wind turbine based on the first weather forecast and a power forecasting model, wherein the forecasted output power is provided to adjust integration planning and operation status of wind turbines within a wind farm.

2. The method of claim 1, wherein correcting the wind turbine weather forecasting model for the second wind turbine to forecast the power comprises applying time-series regression based on historical meteorological elements and wind turbine generating power data associated with the second wind turbine to forecast the power.

3. The method of claim 1, wherein the sensor measurements are collected from the wind tower.

4. The method of claim 1, wherein the sensor measurements are collected from the first wind turbine, determining a wind direction comprising determining actual wind turbine power generated by the first wind turbine at the first time and a power curve deviation for the first wind turbine.

5. The method of claim 1, wherein collecting the sensor measurements in real time at the one or more wind power generation assets at the first time comprises collecting sensor measurements of the wind farm including a plurality of wind power generation assets but not including the second wind turbine.

6. The method of claim 5, wherein collecting the sensor measurements in real time of the wind farm includes collecting sensor measurements from a subset of the one or more wind power generation assets, the subset of the one or more wind power generation assets including one or more wind turbines at geographical locations that are at a predetermined distance from each other within the wind farm.

7. The method of claim 6, wherein sensor measurements of the one or more wind turbines are averaged and the averaged sensor measurements are used for correcting the wind turbine weather forecasting model.

8. The method of claim 6, further comprising filtering the sensor measurements by subtracting the average from any number of wind turbines in the wind farm to remove sensor measurements and create filtered sensor measurements, the filtered sensor measurements being used for correcting the wind turbine weather forecasting model.

9. The method of claim 2, further comprising multi-modal combination forecasting wherein a mean is calculated in view of the power previously forecasted for forecast stability, wherein providing the forecast power of the second wind turbine comprises providing the mean.

10. An apparatus for forecasting output power of a wind turbine in a wind farm, the apparatus comprising:

one or more computer processors;

one or more computer readable storage media; and program instructions stored on the one or more computer readable storage media for executing by at least one of the one or more computer processors to:

generate a wind turbine weather forecasting model associated with one or more wind power generation assets based on Global Forecast System data associated with the one or more wind power generation assets and terrain data associated with the one or more wind power generation assets;

collect sensor measurements in real time at the one or more wind power generation assets at a first time, the sensor measurements being collected from meteorological sensors located at the one or more wind power generation assets, the sensor measurements being related to weather at the one or more wind power generation assets, the one or more wind power generation assets including at least one of a wind tower and a first wind turbine, the one or more wind power generation assets being proximate to each other;

generate a corrected data set based on a subset of the collected sensor measurements, the generating being based on spatial location of the one or more wind power generation assets, wherein the corrected data set comprises location-specific meteorological corrections that compensate for terrain effects at each spatial location;

correct the wind turbine weather forecasting model for a second wind turbine based on the corrected data set to generate a first weather forecast for the second wind turbine, the second wind turbine not being proximate to the one or more wind power generation assets, wherein correcting comprises applying the location-specific meteorological corrections to account for spatial variations in weather conditions between the proximate one or more wind power generation assets and the non-proximate second wind turbine;

correct the wind turbine weather forecasting model for the second wind turbine to forecast power at the second wind turbine at least 10 minutes after the first time; and forecast output power of the second wind turbine based on the first weather forecast and a power forecasting model, wherein the forecasted output power is provided to adjust integration planning and operation status of wind turbines within the wind farm.

11. The apparatus of claim 10, wherein correcting the wind turbine weather forecasting model for the second wind turbine to forecast the power comprises applying time-series regression based on historical meteorological elements and wind turbine generating power data associated with the second wind turbine to forecast the power.

12. The apparatus of claim 10, wherein the sensor measurements are collected from the wind tower.

13. The apparatus of claim 10, wherein the sensor measurements are collected from the first wind turbine, determining a wind direction comprising determining actual wind turbine power generated by the first wind turbine at the first time and a power curve deviation for the first wind turbine.

14. The apparatus of claim 10, wherein collecting the sensor measurements in real time at the one or more wind power generation assets at the first time comprises collecting sensor measurements of the wind farm including a plurality of wind power generation assets but not including the second wind turbine.

15. The apparatus of claim 14, wherein collecting the sensor measurements in real time of the wind farm includes collecting sensor measurements from a subset of the one or more wind power generation assets, the subset of the one or more wind power generation assets including one or more wind turbines at geographical locations that are at a predetermined distance from each other within the wind farm.

16. The apparatus of claim 15, wherein sensor measurements of the one or more wind turbines are averaged and the averaged sensor measurements are used for correcting the wind turbine weather forecasting model.

17. The apparatus of claim 15, wherein the program instructions stored on the one or more computer readable storage media for further executing by at least one of the one or more computer processors to filter the sensor measurements by subtracting the average from any number of wind turbines in the wind farm to remove sensor measurements and create filtered sensor measurements, the filtered sensor measurements being used for correcting the wind turbine weather forecasting model.

18. The apparatus of claim 11, wherein the program instructions stored on the one or more computer readable storage media for further executing by at least one of the one or more computer processors to multi-modal combination forecast wherein a mean is calculated in view of the power previously forecasted for forecast stability, wherein providing the forecast power of the second wind turbine comprises providing the mean.

19. A non-transitory computer readable medium comprising instructions that, when executed, cause one or more processors to perform a method, the method comprising:

generating a wind turbine weather forecasting model associated with one or more wind power generation assets based on Global Forecast System data associated with the one or more wind power generation assets and terrain data associated with the one or more wind power generation assets;

collecting sensor measurements in real time at the one or more wind power generation assets at a first time, the sensor measurements being collected from meteorological sensors located at the one or more wind power generation assets, the sensor measurements being related to weather at the one or more wind power generation assets, the one or more wind power generation assets including at least one of a wind tower and a first wind turbine, the one or more wind power generation assets being proximate to each other;

generating a corrected data set based on a subset of the collected sensor measurements, the generating being based on spatial location of the one or more wind power generation assets, wherein the corrected data set comprises location-specific meteorological corrections that compensate for terrain effects at each spatial location;

correcting the wind turbine weather forecasting model for a second wind turbine based on the corrected data set to generate a first weather forecast for the second wind turbine, the second wind turbine not being proximate to the one or more wind power generation assets, wherein correcting comprises applying the location-specific meteorological corrections to account for spatial variations in weather conditions between the proximate one or more wind power generation assets and the non-proximate second wind turbine;

correcting the wind turbine weather forecasting model for the second wind turbine to forecast power at the second wind turbine at least 10 minutes after the first time; and forecasting output power of the second wind turbine based on the first weather forecast and a power forecasting model, wherein the forecasted output power is provided to adjust integration planning and operation status used for real time operational control of wind turbines within a wind farm-systems.

* * * * *